US008936366B2

(12) United States Patent
Papaefstathiou et al.

(10) Patent No.: US 8,936,366 B2
(45) Date of Patent: Jan. 20, 2015

(54) ILLUMINATED SKIN ROBOT DISPLAY

(75) Inventors: Efstathios Papaefstathiou, Redmond, WA (US); Russell Sanchez, Seattle, WA (US); Nathaniel T. Clinton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 13/162,596

(22) Filed: Jun. 17, 2011

(65) Prior Publication Data

US 2012/0320343 A1    Dec. 20, 2012

(51) Int. Cl.
*G03B 21/28*    (2006.01)
(52) U.S. Cl.
CPC .................................. *G03B 21/28* (2013.01)
USPC ................................................ 353/28; 353/77
(58) Field of Classification Search
USPC ..................................... 353/28, 74, 77, 78, 79
See application file for complete search history.

(56) References Cited

U.S. PATENT DOCUMENTS

| | | | | |
|---|---|---|---|---|
| 3,973,840 A | * | 8/1976 | Jacobs et al. | 352/86 |
| 4,978,216 A | * | 12/1990 | Liljegren et al. | 353/28 |
| 6,165,170 A | | 12/2000 | Wynne et al. | |
| 6,467,908 B1 | * | 10/2002 | Mines et al. | 353/28 |
| 7,197,851 B1 | | 4/2007 | Jouppi et al. | |
| 7,562,983 B2 | * | 7/2009 | Kim et al. | 353/10 |
| 8,256,904 B2 | * | 9/2012 | Reichow et al. | 353/119 |
| 2005/0162511 A1 | | 7/2005 | Jackson | |
| 2007/0192910 A1 | | 8/2007 | Vu et al. | |
| 2010/0066978 A1 | * | 3/2010 | Powell et al. | 353/10 |
| 2010/0226617 A1 | | 9/2010 | Piccionelli | |

OTHER PUBLICATIONS

Lincoln, et al., "Animatronic Shader Lamps Avatars", Retrieved at <<http://ieeexplore.ieee.org/stamp/stamp.jsp?tp= &arnumber=5336503 >>, IEEE International Symposium on Mixed and Augmented Reality, Oct. 19-22, 2009, p. 27-33.
Nikolaev, et al., "Transparent Grippers for Robot Vision", Retrieved at << http://ieeexplore.ieee.org/stamp/stamp.jsp?tp= &arnumber=506948 >>, Proceedings of the IEEE International Conference on Robotics and Automation, Apr. 1996, p. 1644-1649.

* cited by examiner

*Primary Examiner* — William C Dowling
(74) *Attorney, Agent, or Firm* — Steve Wight; Sergey Lamansky; Micky Minhas

(57) ABSTRACT

There is provided a robot that includes a processor executing instructions that determine a desired image to be displayed. The processor issues control signals corresponding to the desired image to be displayed. The robot also comprises a display assembly including a visual projector, a mirror, and a display surface. The visual projector and mirror are disposed within the robot. The visual projector projects light corresponding to the desired image onto the mirror. The mirror receives the light from the projector, and reflects the light onto the display surface. The display surface receives the light. The image is visible on the display surface from outside the robot.

19 Claims, 5 Drawing Sheets

ILLUMINATED SKIN ROBOT DISPLAY

BACKGROUND

A visual interface is typically a display attached to a computing device. Examples of computing devices include traditional desktop computers, mobile devices, and robotic devices. The typical, flat, rectangular display has become an iconic form of visual interface. Further, the prevalence of conventional computer, TV, and mobile device displays has created affordances, and expectations, regarding the methods of interaction with the interface. Interaction methods include the use of a mouse, keyboard, remote control, and, increasingly, touch interfaces. The presence of a flat rectangular screen on a robot implies to a user that traditional methods are to be employed.

SUMMARY

The following is a brief summary of subject matter that is described in greater detail herein. This summary is not intended to be limiting as to the scope of the claims. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter generally provides a robot having a display. One embodiment of the claimed subject matter relates to a robot having a processor that executes instructions that determine, and issues control signals corresponding to, a desired image to be displayed. The robot also includes a display assembly having a visual projector, a mirror, and a display surface. The visual projector and mirror are disposed within the robot. The visual projector projects light corresponding to the desired image onto the minor. The mirror receives the light from the projector, and reflects the light onto the display surface. The display surface receives the light. The image is visible on the display surface from outside the robot.

Another embodiment of the claimed subject matter relates to a display assembly that includes a visual projector, a mirror, and a display surface. The visual projector is disposed within a robotic device. The visual projector also projects light corresponding to an image onto a mirror. The mirror reflects the light onto the display surface. The display surface comprises a curvature and a light-diffusing material. The display surface also receives the light. The image is visible on the display surface from outside the robotic device.

Yet another embodiment of the claimed subject matter relates to a method of displaying an image. A request to display the image is received. In response to the request, light corresponding to the image is projected from a digital graphic projector onto a mirror. The light is reflected from the mirror onto a display surface. The display surface includes a curvature and a light-diffusing material. The image is visible on the display surface from outside a robotic device comprising the digital graphic projector and the mirror. The digital graphic projector and the mirror are concealed from external view when no image is displayed on the display surface.

DETAILED DESCRIPTION

Figure 1:
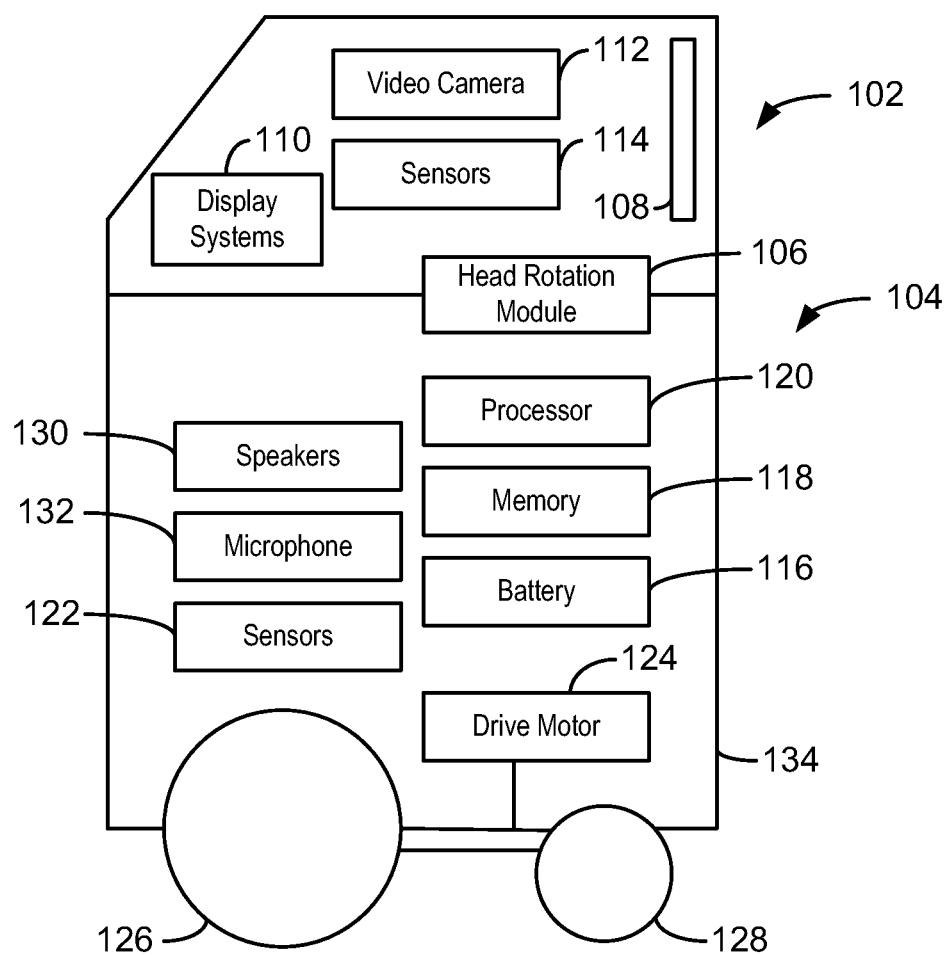
FIG. 1 is a block diagram of a robotic device or robot in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory deices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The typical, flat, rectangular screen on a computing device may appear as if the display is a separate component, specifically in the application of robotic computing devices. In one embodiment, the visual interface may appear to be a natural feature of the robot. Additionally, interactions between human users and computing devices are limited by traditional display interfaces. Improvements in human-robot interaction may utilize different paradigms of interaction. In one embodiment, such paradigms may incorporate speech and gesture input modalities.

FIG. 1 is a block diagram of a robotic device or robot 100 in accordance with the claimed subject matter. The robot 100 may be capable of communicating with a remotely-located computing device by way of a network connection. The robot 100 is an electro-mechanical machine that includes computer hardware and software that causes the robot 100 to perform functions independently and without assistance from a user. The robot 100 can include a head portion 102 and a body portion 104, wherein the head portion 102 is movable with respect to the body portion 104. Additionally, the robot 100 can include a head rotation module 106 that operates to couple the head portion 102 with the body portion 104, wherein the head rotation module 106 can include one or more motors that can cause the head portion 102 to rotate with respect to the body portion 104. As an example, the head rotation module 106 may rotate the head portion 102 with respect to the body portion 104 up to 45° in any direction. In another example, the head rotation module 106 can allow the head portion 102 to rotate 90° in relation to the body portion 104. In still yet another example, the head rotation module 106 can facilitate 180° rotation of the head portion 102, with respect to the body portion 104. The head rotation module 106 can facilitate rotation of the head portion 102 with respect to the body portion 102 in either angular direction.

The head portion 102 may include an antenna 108 that is configured to receive and transmit wireless signals. For instance, the antenna 108 can be configured to receive and transmit Wi-Fi signals, Bluetooth signals, infrared (IR) signals, sonar signals, radio frequency (RF), signals or other suitable signals. The antenna 108 can be configured to receive and transmit data to and from a cellular tower. Further, the robot 100 may communicate with a remotely-located computing device (not shown) using the antenna 108.

The head portion 102 of the robot 100 also includes one or more display systems 110 configured to display information to an individual that is proximate to the robot 100. The display system 110 is more particularly described with respect to FIGS. 3-4.

A video camera 112 disposed on the head portion 102 may be configured to capture video of an environment of the robot 100. In an example, the video camera 112 can be a high definition video camera that facilitates capturing video data that is in, for instance, 720p format, 720i format, 1080p format, 1080i format, or other suitable high definition video format. The video camera 112 can be configured to capture relatively low resolution data in a format that is suitable for transmission to the remote computing device by way of the antenna 108. As the video camera 112 is mounted in the head portion 102 of the robot 100, through utilization of the head rotation module 106, the video camera 112 can be configured to capture live video data of a relatively large portion of an environment of the robot 100.

The robot 100 may further include one or more sensors 114. The sensors 114 may include any type of sensor that can aid the robot 100 in performing autonomous or semi-autonomous navigation. For example, these sensors 114 may include a depth sensor, an infrared sensor, a camera, a cliff sensor that is configured to detect a drop-off in elevation proximate to the robot 100, a GPS sensor, an accelerometer, a gyroscope, or other suitable sensor type. Additionally, the sensors 114 may include any type of sensor that can aid in receiving user inputs, such as gestures.

The body portion 104 of the robot 100 may include a battery 116 that is operable to provide power to other modules in the robot 100. The battery 116 may be, for instance, a rechargeable battery. In such a case, the robot 100 may include an interface that allows the robot 100 to be coupled to a power source, such that the battery 116 can be recharged.

The body portion 104 of the robot 100 can also include one or more computer-readable storage media, such as memory 118. A processor 120, such as a microprocessor, may also be included in the body portion 104. As will be described in greater detail below, the memory 118 can include a number of components that are executable by the processor 120, wherein execution of such components facilitates controlling and/or communicating with one or more of the other systems and modules of the robot. The processor 120 can be in communication with the other systems and modules of the robot 100 by way of any suitable interface, such as a bus hosted by a motherboard. In an embodiment, the processor 120 functions as the "brains" of the robot 100. For instance, the processor 120 may be utilized to process data received from a remote computing device as well as other systems and modules of the robot 100 and cause the robot 100 to perform in a manner that is desired by a user of such robot 100.

The body portion 104 of the robot 100 can further include one or more sensors 122, wherein such sensors 122 can include any suitable sensor that can output data that can be utilized in connection with autonomous or semi-autonomous navigation. For example, the sensors 122 may include sonar sensors, location sensors, infrared sensors, a camera, a cliff sensor, and/or the like. Data that is captured by the sensors 122 and the sensors 114 can be provided to the processor 120, which can process the data and autonomously navigate the robot 100 based at least in part upon the data output.

A drive motor 124 may be disposed in the body portion 104 of the robot 100. The drive motor 124 may be operable to drive wheels 126 and/or 128 of the robot 100. For example, the wheel 126 can be a driving wheel while the wheel 128 can be a steering wheel that can act to pivot to change the orientation of the robot 100. Additionally, each of the wheels 126 and 128 can have a steering mechanism to change the orientation of the robot 100. Furthermore, while the drive motor 124 is shown as driving both of the wheels 126 and 128, it is to be understood that the drive motor 124 may drive only one of the wheels 126 or 128 while another drive motor can drive the other of the wheels 126 or 128. Upon receipt of data from the sensors 114 and 122 and/or receipt of commands from the remote computing device (for example, received by way of the antenna 108), the processor 120 can transmit signals to the head rotation module 106 and/or the drive motor 124 to control orientation of the head portion 102 with respect to the body portion 104, and/or to control the orientation and position of the robot 100.

The body portion 104 of the robot 100 can further include speakers 130 and a microphone 132. Data captured by way of the microphone 132 can be transmitted to the remote computing device by way of the antenna 108. Accordingly, a user at the remote computing device can receive a real-time audio/video feed and may experience the environment of the robot 100. The speakers 130 can be employed to output audio data to one or more individuals that are proximate to the robot 100. This audio information can be a multimedia file that is retained in the memory 118 of the robot 100, audio files received by the robot 100 from the remote computing device by way of the antenna 108, real-time audio data from a webcam or microphone at the remote computing device, etc. The components described above may be enclosed within a robot skin 134. In one embodiment, the skin 134 may be a polycarbonate material.

While the robot 100 has been shown in a particular configuration and with particular modules included therein, it is to be understood that the robot can be configured in a variety of different manners, and these configurations are contemplated and are intended to fall within the scope of the hereto-appended claims. For instance, the head rotation module 106 can be configured with a tilt motor so that the head portion 102 of the robot 100 can tilt in a vertical direction. Alternatively, the robot 100 may not include two separate portions, but may include a single unified body, wherein the robot body can be turned to allow the capture of video data by way of the video camera 112. In still yet another embodiment, the robot 100 can have a unified body structure, but the video camera 112 can have a motor, such as a servomotor, associated therewith that allows the video camera 112 to alter position to obtain different views of an environment. Modules that are shown to be in the body portion 104 can be placed in the head portion 102 of the robot 100, and vice versa. It is also to be understood that the robot 100 has been provided solely for the purposes of explanation and is not intended to be limiting as to the scope of the hereto-appended claims.

Figure 2:
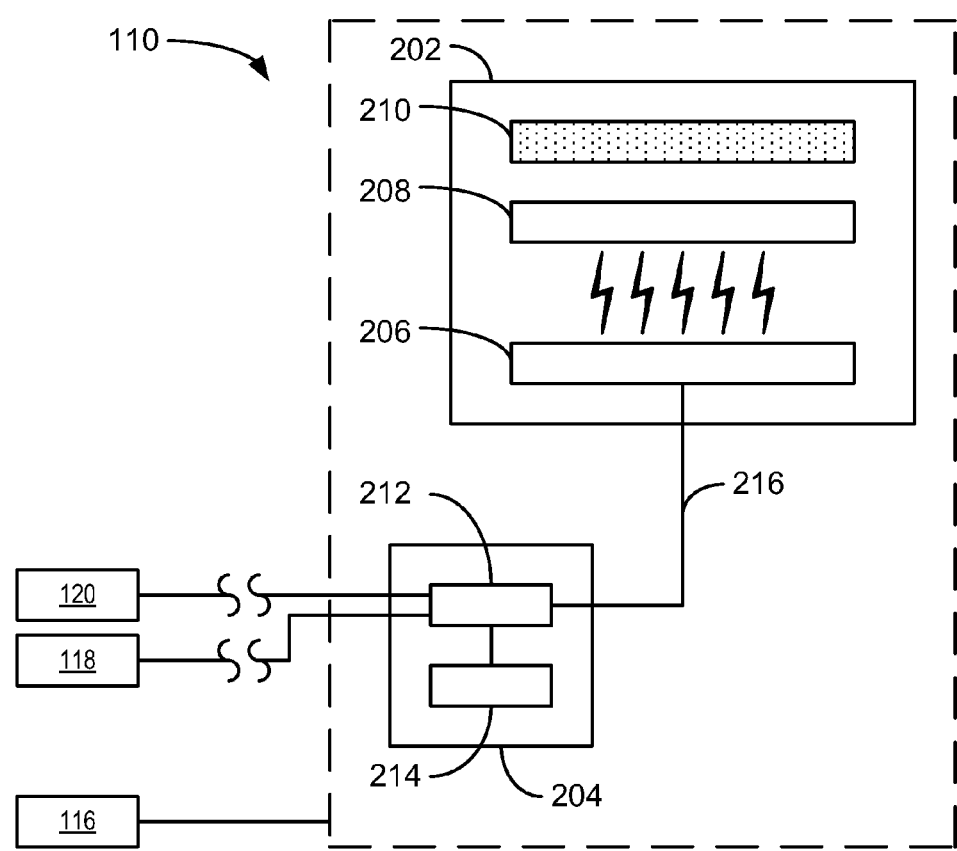
FIG. 2 is a block diagram of one embodiment of a display system in accordance with the claimed subject matter.

FIG. 2 is a block diagram of one embodiment of a display system 110 in accordance with the claimed subject matter. As explained herein, an example embodiment of the subject innovation provides a visual display that appears as an illuminated skin of the robot 100. The display system 110 is connected to and powered by the battery 116, and includes a display assembly 202 and a display control unit (DCU) 204. The display assembly 202 includes a projector 206, a mirror, 208, and a display surface 210.

The projector 206 may provide an image for display on the display surface 210. The mirror 208 may fold the light path, increase the image size, and project the image onto the display surface 210. The display surface 210 may be a light-diffusing area of the robot's inner surface that makes the image visible from outside the robot 100. The display surface 210 may include a translucent or optically-tinted member that may be planar, curved or otherwise configured to be suitable for the intended location of images projected from the projector 206. Additionally, the display surface 210 conceals the projector 206, mirror 208, and the other internal components of the light assembly 202 from view. This may be true whether or not an image is being displayed on the display surface. The projector 206, mirror 208, and display surface 210 are described in greater detail with respect to FIG. 3.

The DCU 204 includes a DCU processor 212 and a DCU memory 214. The DCU processor 212 may include a microprocessor, which communicates with processor 120 and is capable of accessing the memory 118, either directly or via the processor 120. The DCU memory 214 may include read only memory, hard disk memory, and the like, which stores a plurality of components that are accessible to and executable by the DCU processor 212 to control the operation of the display assembly 202 via control signals 216. Further, the DCU memory 214 is accessible by the DCU processor 212 for the purposes of writing data to, and reading data from, memory 118. The display system 110 can be configured to allow the processor 120 to directly control the display assembly 202 by executing one or more components stored within memory 118.

Figure 3:
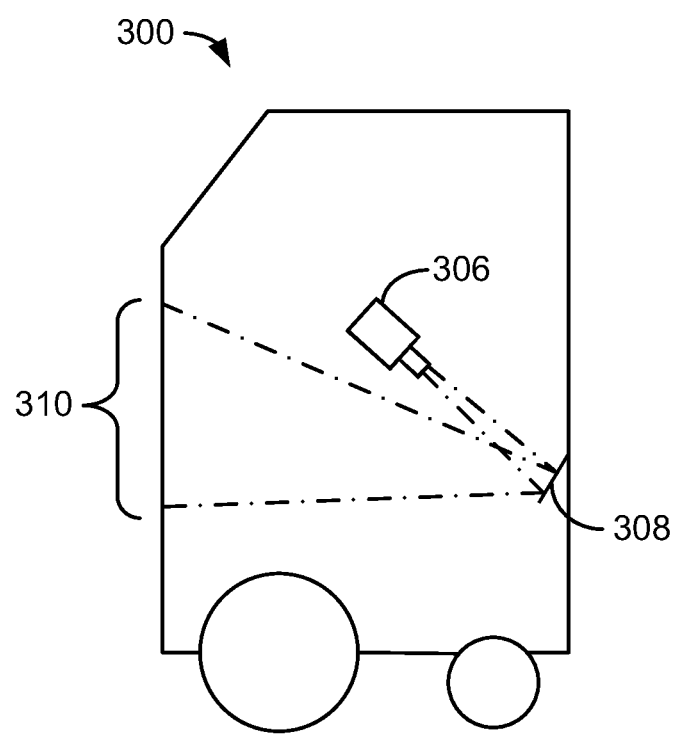
FIG. 3 is a block diagram of a robot in accordance with the claimed subject matter.

FIG. 3 is a block diagram of a robot 300 in accordance with the claimed subject matter. A display assembly 202 on the robot 300 includes a projector 306, mirror 308, and display surface 310. The projector 306 may be a digital graphic projector inside the robot's body, which projects images on the mirror 308. As shown, the mirror 308 reflects the images onto the inside of the display surface 310. When the display surface 210 is illuminated, regions that are not illuminated may appear integrated with the robot skin 136. In contrast to a typical display, the images may appear to float on the surface, not framed within a typical, illuminated, rectangular display area. In other words, the display surface 310 may not be visible with exception to the images being projected. When no image is displayed, the display surface 210, when viewed from outside the robot 100, may appear integrated with the robot skin 136. The display surface 310 may be tinted according to an appearance of the robot skin 136. For example, the display surface 310 may be tinted black for a robot skin 136 that appears black.

The display surface 310 may conform to a natural shape, e.g., a body surface curvature. The curvature may comprise a compound or complex curvature. The display surface displays visual elements illuminated on the skin of the robot 300 appearing as if generated from within the robot's body. Such a display technique avoids affordances of conventional flat rectangular displays and more effectively unifies a visual expression of the robot 300 with its functionality and modes of interaction. The display surface 310 makes the image visible from the outside of the robot 300.

Figure 4:
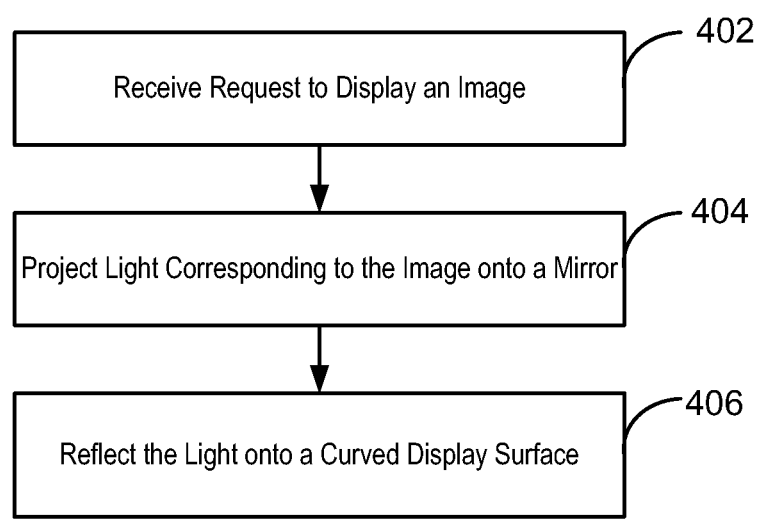
FIG. 4 is a process flow diagram of a method of displaying an image in accordance with the claimed subject matter.

FIG. 4 is a process flow diagram of a method 400 of displaying an image, in accordance with the claimed subject matter. The method 400 begins at block 402, where a request to display an image is received. A processor, such as the processor 120 or the DCU processor 252, may send control signals to the display assembly 202. The control signals may correspond to a desired image to be displayed. At block 404, the visual projector 206 may project light corresponding to the image onto the mirror 208. At block 406, the mirror 208 may reflect the light onto a curved display surface, such as the display surface 210. The display surface 210 may conceal the internal components of the display assembly 202, whether or not an image is being displayed.

Figure 5:
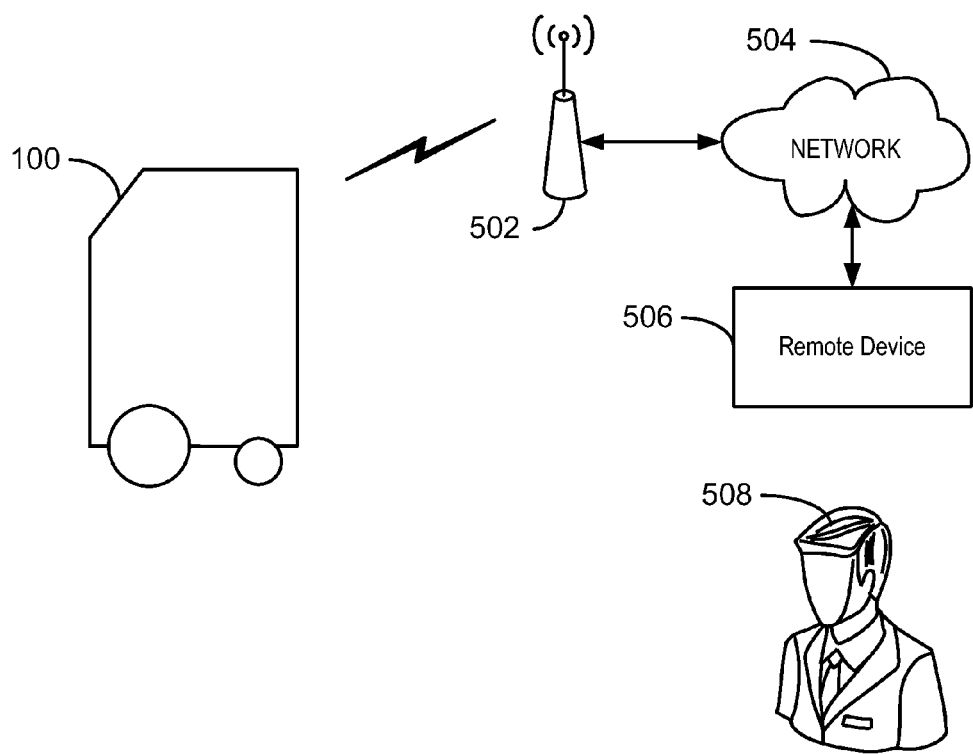
FIG. 5 is a block diagram of an environment that facilitates communications between the robot and one or more remote devices, in accordance with the claimed subject matter.

FIG. 5 is a block diagram of an environment 500 that facilitates communications between the robot 100 and remote devices 506, in accordance with the claimed subject matter. More particularly, the environment 500 includes a wireless access point 502, a network 504, and one or more remote devices 506. The robot 100 is configured to receive and transmit data wirelessly via antenna 108. In an exemplary embodiment, the robot 100 initializes on power up and communicates with a wireless access point 502 and establishes its presence with such the access point 502. The robot 100 may then obtain a connection to one or more networks 504 by way of the access point 502. For example, the networks 504 may include a cellular network, the Internet, a proprietary network such as an intranet, or other suitable network.

Each of the remote devices 506 can have respective applications executing thereon that facilitate communication with the robot 100 by way of the network 504. For example, a communication channel can be established between the remote device 506 and the robot 100 by way of the network 504 through various actions such as handshaking, authentication, and other similar methods. The remote devices 506 may include a desktop computer, a laptop computer, a mobile telephone or smart phone, a mobile multimedia device, a gaming console, or other suitable remote device. The remote device 506 can include or have associated therewith a display or touch screen (not shown) that can present data, images, and other information, and provide a graphical user interface to a user 508 pertaining to navigation, control, and the environment surrounding the robot 100. For instance, the robot 100 can transmit a live audio/video feed of its environment to the remote device 506 by way of the network 504, and the remote device 506 can present this audio/video feed to the user 508. As a further example, the robot 100 can transmit information relating to the environment of robot 100 based on data from sensors 114 and 122 received by the processor 120, including temperature, humidity and other data relating to the environment of the robot 100.

As a still further example, the robot 100 can also transmit information relating to its movement and/or current location, direction and speed of movement, next destination, and other information relating to location and movement of the robot 100. The user 508 may transmit a variety of commands, including commands related to the display systems 110 described above, by way of the remote device 506 via the network 504. More specifically, the display systems 110 may display an image visible on the robot skin 136. The internal components of the display assembly 202 may be concealed whether or not an image is being displayed. The display surface 210 may appear integrated with the robot skin 136 when no image is displayed. Areas of the display surface 210 may also appear integrated with the robot skin when an image is displayed. These areas may be regions of the display surface 210 where the image is not illuminated.

While the systems, methods and flow diagram described above have been described with respect to robots, it is to be understood that various other devices that utilize or include display technology can utilize aspects described herein. For instance, various industrial equipment, automobile displays, and the like may apply the inventive concepts disclosed herein.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An autonomous mobile device, comprising:
    a processor executing instructions that determine a desired image to be displayed, the processor issuing control signals corresponding to the desired image to be displayed; and
    a display assembly, comprising:
        a mirror;
        a display surface; and
        a visual projector disposed within the autonomous mobile device, the visual projector projecting light corresponding to the desired image onto the minor, the minor reflecting the light onto the display surface, the display surface receiving the light, and wherein the desired image is visible on the display surface from outside the autonomous mobile device, the mirror being configured to be tilted to adjust a size of the desired image, the desired image appearing to float on the display surface, the display surface appearing integrated with a skin of the autonomous mobile device, the display surface appearing integrated with the skin in regions where the desired image is not illuminated, the display surface not being illuminated with exception of the desired image.

2. The autonomous mobile device of claim 1, wherein the display surface comprises a light-diffusing material.

3. The autonomous mobile device of claim 1, wherein the display surface conceals internal components of the display assembly from external view when the desired image is being displayed thereon.

4. The autonomous mobile device of claim 1, wherein the display surface conceals internal components of the display assembly from external view when no image is being displayed thereon.

5. The autonomous mobile device of claim 1, wherein the display surface appears integrated with the skin of the autonomous mobile device.

6. The autonomous mobile device of claim 1, wherein the display surface comprises a curvature.

7. The autonomous mobile device of claim 6, wherein the curvature comprises a compound curvature.

8. The autonomous mobile device of claim 1, wherein the visual projector comprises a digital graphic projector.

9. A display assembly, comprising:
a mirror;
a display surface that comprises a curved, light-diffusing material; and
a visual projector disposed within an autonomous mobile device, wherein the visual projector projects light corresponding to an image onto the mirror, the mirror reflecting the light onto the display surface, the display surface receiving the light, the image being visible on the display surface from outside the autonomous mobile device, the minor being configured to be tilted to adjust a size of the image, the image appearing to float on the display surface, the display surface appearing integrated with a skin of an autonomous mobile device comprising the display assembly, the display surface appearing integrated in regions where the image is not illuminated, the display surface not being illuminated with exception of the image.

10. The display assembly of claim 9, wherein the display surface conceals internal components of the display assembly from external view when an image is being displayed thereon.

11. The display assembly of claim 10, wherein the display surface conceals internal components of the display assembly from external view when no image is being displayed thereon.

12. The display assembly of claim 9, wherein the display surface appears integrated with the skin of the autonomous mobile device.

13. The display assembly of claim 9, wherein the display surface comprises a polycarbonate material.

14. A method of displaying an image, comprising:
receiving a request to display the image;
projecting, in response to the request, light corresponding to the image from a digital graphic projector onto a mirror; and
reflecting the light from the mirror onto a display surface comprising a curvature and a light-diffusing material, the image being visible on the display surface from outside an autonomous mobile device comprising the digital graphic projector and the minor, and the digital graphic projector and the mirror being concealed from external view when the image is being displayed on the display surface, the display surface appearing integrated with a skin of the autonomous mobile device, the display surface appearing integrated in regions where the image is not illuminated, the display surface not being illuminated with exception of the image.

15. The method of claim 14, wherein the digital graphic projector and the minor are concealed from external view when no image is being displayed on the display surface.

16. The method of claim 14, wherein the display surface comprises a black tint, and wherein the skin of the autonomous mobile device appears black.

17. The method of claim 14, wherein the minor is configured to be tilted to adjust a size of the image.

18. The method of claim 14, wherein the display surface appears integrated with the skin of the autonomous mobile device.

19. The autonomous mobile device of claim 1, the display surface comprising a complex curvature, the display surface displaying visual elements on the skin of the autonomous mobile device appearing as if generated from within a body of the autonomous mobile device.

* * * * *